United States Patent
Lee

(10) Patent No.: US 7,289,136 B2
(45) Date of Patent: Oct. 30, 2007

(54) LASER SCANNING UNIT AND TANDEM IMAGE FORMING APPARATUS HAVING THE SAME

(75) Inventor: Tae-kyoung Lee, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 21 days.

(21) Appl. No.: 11/356,066

(22) Filed: Feb. 17, 2006

(65) Prior Publication Data

US 2006/0284063 A1    Dec. 21, 2006

(30) Foreign Application Priority Data

Jun. 21, 2005    (KR) ............... 10-2005-0053440

(51) Int. Cl.
*G02B 26/12*    (2006.01)
*B41J 2/447*    (2006.01)

(52) U.S. Cl. .............. 347/243; 347/244; 359/204

(58) Field of Classification Search ........ 347/233, 347/241, 243, 244
See application file for complete search history.

(56) References Cited

U.S. PATENT DOCUMENTS 6,144,477 A * 11/2000 Takeuchi .............. 359/207

6,831,763 B2 * 12/2004 Takakubo .............. 359/204

FOREIGN PATENT DOCUMENTS

| CN | 1189627 | 8/1998 |
|---|---|---|
| CN | 2507106 | 8/2002 |
| JP | 10-253906 | 9/1998 |
| JP | 11-084285 | 3/1999 |
| JP | 2000-056246 | 2/2000 |
| JP | 2003-185954 | 7/2003 |
| JP | 2003-195002 | 7/2003 |
| JP | 2004-226884 | 8/2004 |
| KR | 10-2005-0017859 | 2/2005 |

* cited by examiner

*Primary Examiner*—Huan Tran
(74) *Attorney, Agent, or Firm*—Roylance, Abrams, Berdo & Goodman, L.L.P.

(57) ABSTRACT

A laser scanning unit includes a light source for emitting a plurality of laser beams, a rotating polygon mirror for deflecting the plurality of laser beams in a predetermined direction, an fθ lens for transmitting the deflected laser beams to be scanned onto the surfaces of a plurality of photosensitive drums, and a beam splitter disposed at a rear end of the fθ lens for splitting the laser beams. The laser scanning unit may be used for a tandem image forming apparatus.

20 Claims, 5 Drawing Sheets

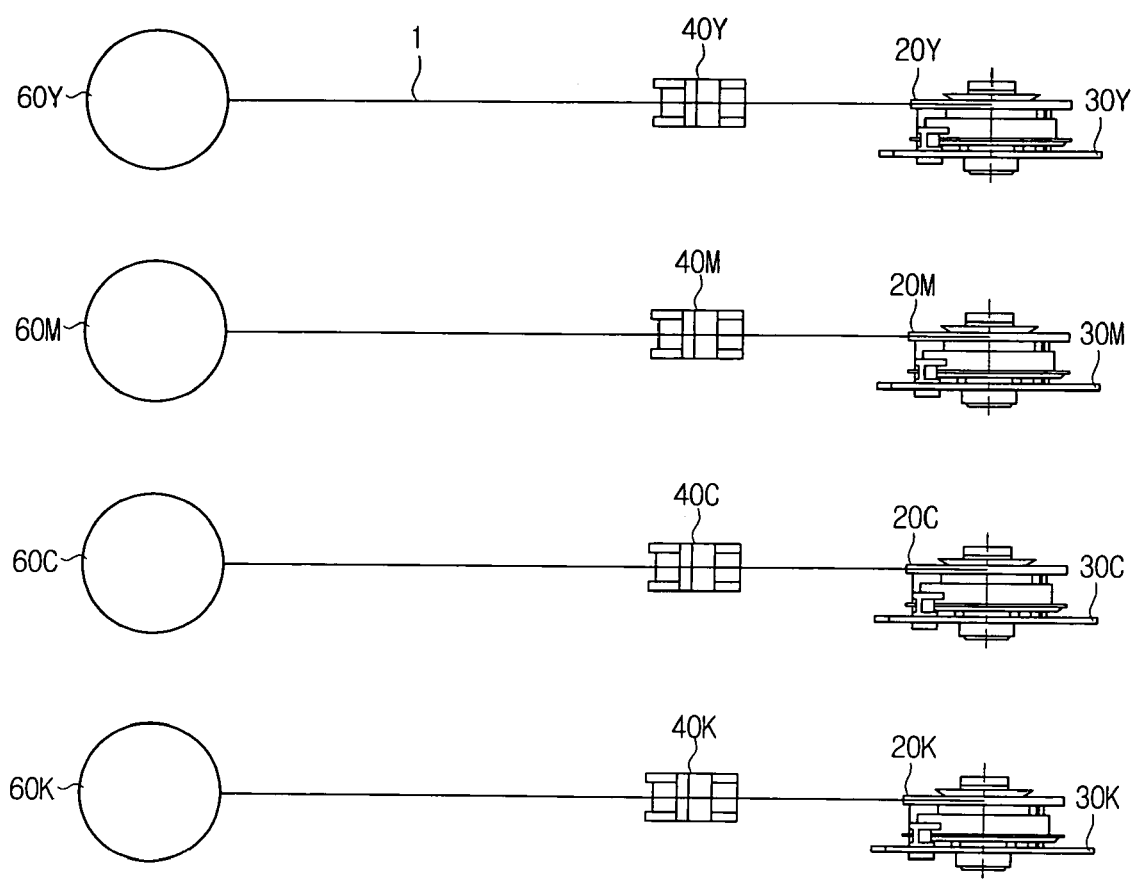

LASER SCANNING UNIT AND TANDEM IMAGE FORMING APPARATUS HAVING THE SAME

CROSS-REFERENCE TO RELATED APPLICATIONS

This application claims the benefit under 35 U.S.C. § 119(a) of Korean Patent Application No. 2005-53440. filed on Jun. 21, 2005, the entire contents of which are hereby incorporated by reference.

BACKGROUND OF THE INVENTION

1. Field of the Invention

The present invention generally relates to an image forming apparatus, such as a copier, printer, fax machine, or the like, that uses an electrophotography process. More specifically, the present invention relates to a laser scanning unit having a beam splitter which is capable of splitting a laser beam with high efficiency, and a tandem image forming apparatus having the laser scanning unit.

2. Description of the Related Art

In general, a laser scanning unit forms an electrostatic latent image, according to video data to be printed, by scanning a modulated laser beam onto the surface of a photosensitive drum.

FIG. 1 illustrates a conventional laser scanning unit for the purpose of explaining a laser scanning process. Referring to FIG. 1, in the laser scanning unit, laser beams 1 emitted from a light source 10 such as a laser diode 11 pass through a collimating lens 12 and a cylindrical lens 13, and are reflected and deflected by a polygon mirror 20 driven by a driving means 30. The deflected laser beams pass through an fθ lens 40, and are scanned horizontally (main scanning direction) onto the surface of a dielectric photosensitive drum 60 by a reflecting mirror 50 to form a latent image. The drum 60 rotates at a constant speed for the perpendicular (sub-scanning direction) scanning of a page.

In a color image forming apparatus, a plurality of laser beams generated from a light source are scanned onto a plurality of photosensitive drums corresponding to respective colors. Therefore, it is important that a laser scanning unit used in the image forming apparatus is capable of splitting the laser beams very efficiently.

FIGS. 2a and 2b illustrate the configuration of laser scanning units used in a tandem image forming apparatus, which is an example of a color image forming apparatus. Generally, a tandem color image forming apparatus has one of two types of laser scanning units. In the first type of unit, shown in FIG. 2A, a plurality of laser beams 1 pass through a plurality of polygon mirrors 20Y, 20M, 20C, 20K and their corresponding fθ lenses 40Y, 40M, 40C, 40K, and form latent images on photosensitive drums 60Y, 60M, 60C, 60K, respectively. Since each of the driving means 30Y, 30M, 30C, 30K and each of the lenses 40Y, 40M, 40C, 40K have their own properties and the laser scanning unit needs to be adjusted for each of them, the total number of components required is large and the control of the laser scanning unit is difficult. In the second type of laser scanning unit, illustrated in FIG. 2B, a plurality of laser beams 1 pass through a single polygon mirror 20a (which is driven by a driving means 30a) and a plurality of fθ lenses 40Y, 40M, 40C, 40K, and form latent images on the photosensitive drums 60Y, 60M, 60C, 60K, respectively. In this case, a deflecting means may be shared by deflecting laser beams to a single polygon mirror simultaneously. However, despite the use of the fθ lens group and the reflecting mirror group 50Y, 50C, 50K for separating the laser beams, the space between the beams is small, and the control of the laser beams is restricted due to the limited space. Further, the configuration of the image forming apparatus remains relatively complicated.

Accordingly, there is a need for a laser scanning unit which provides increased space between laser beams with a simple configuration.

SUMMARY OF THE INVENTION

An aspect of the present invention is to address at least the above problems and/or disadvantages and to provide at least the advantages described below. Accordingly, an aspect of the present invention is to provide a laser scanning unit having a high-efficiency beam splitter which is capable of increasing the space between laser beams.

Another aspect of the present invention is to provide a tandem image forming apparatus having the laser scanning unit.

In accordance with an aspect of the present invention, a laser scanning unit includes a light source for emitting a plurality of laser beams, a rotating polygon mirror for deflecting the plurality of laser beams in a predetermined direction, an fθ lens for transmitting the deflected laser beams to be scanned onto the surfaces of a plurality of photosensitive drums, and a beam splitter disposed at a rear end of the fθ lens for splitting the laser beams.

In accordance with another aspect of the present invention, a tandem color image forming apparatus includes a laser scanning unit for modulating and scanning data to be printed into laser beams and a plurality of photosensitive drums having a latent image formed on surfaces thereof by the laser beams. The laser scanning unit includes a light source formed of a semiconductor chip for emitting a plurality of laser beams, a rotating polygon mirror for deflecting the plurality of laser beams in a predetermined direction, an fθ lens for transmitting the deflected laser beams to be scanned onto the surfaces of a plurality of photosensitive drums, and a beam splitter formed of different mediums and disposed at a rear end of the fθ lens for separating the laser beams.

In accordance with still another aspect of the present invention, a tandem color image forming apparatus includes a laser scanning unit for modulating and scanning data to be printed into laser beams; and a plurality of photosensitive drums having a latent image formed on the surface thereof by the laser beams. The laser scanning unit includes a light source formed of a semiconductor chip for emitting a plurality of laser beams, a rotating polygon mirror for deflecting the plurality of laser beams in a predetermined direction, an fθ lens for transmitting the deflected laser beams to be scanned onto the surfaces of a plurality of photosensitive drums, and a beam splitter disposed at a rear end of the fθ lens. The beam splitter has a stepwise inclined emitting plane with respect to a normal of an incident laser beams for separating the laser beams.

The beam splitter may have a structure where mediums having different indexes of refraction are arranged so that the plurality of laser beams are split in a perpendicular direction (sub-scanning direction).

The beam splitter may have a structure where mediums having different indexes of refraction are arranged so that a space between emitted laser beams is larger than a space between incident laser beams.

Interfaces between different mediums of the beam splitter may be inclined, and the inclined interfaces of the mediums in the beam splitter may be planar.

The total number of the mediums of the beam splitter may be an odd number greater than 3.

A medium with a small index of refraction in the beam splitter may be disposed between mediums with a large index of refraction.

To separate the laser beams in a perpendicular direction (sub-scanning direction), an emitting plane of the beam splitter may be inclined in a stepwise manner with respect to a normal of an incident light.

The emitting plane of the beam splitter may be built in a manner that inclination angles between the stepwise inclined planes and the normal of the incident light are the same as, or different from one another.

The light source may be formed of a semiconductor chip emitting a plurality of laser beams simultaneously.

The laser scanning unit may further include a reflecting mirror between the beam splitter and the photosensitive drums.

The laser scanning unit having the beam splitter with the above configuration may be used in a tandem color image forming apparatus.

BRIEF DESCRIPTION OF THE DRAWINGS

The above and other objects, features, and advantages of certain exemplary embodiments of the present invention will be more apparent from the following description taken in conjunction with the accompanying drawings, in which:

FIGS. 2a and 2b illustrate the configuration of conventional tandem laser scanning units;

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
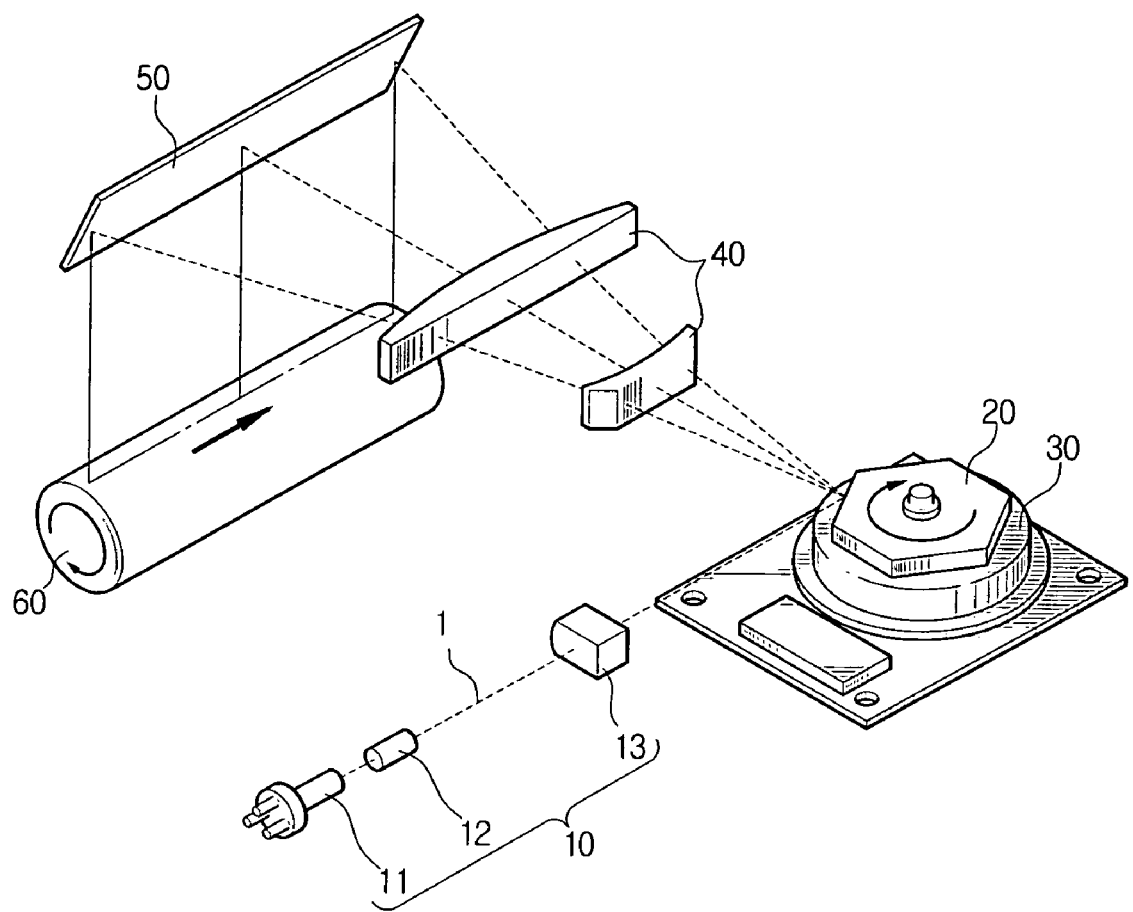
FIG. 1 illustrates the configuration of a conventional laser scanning unit (LSU)
Figure 2B:
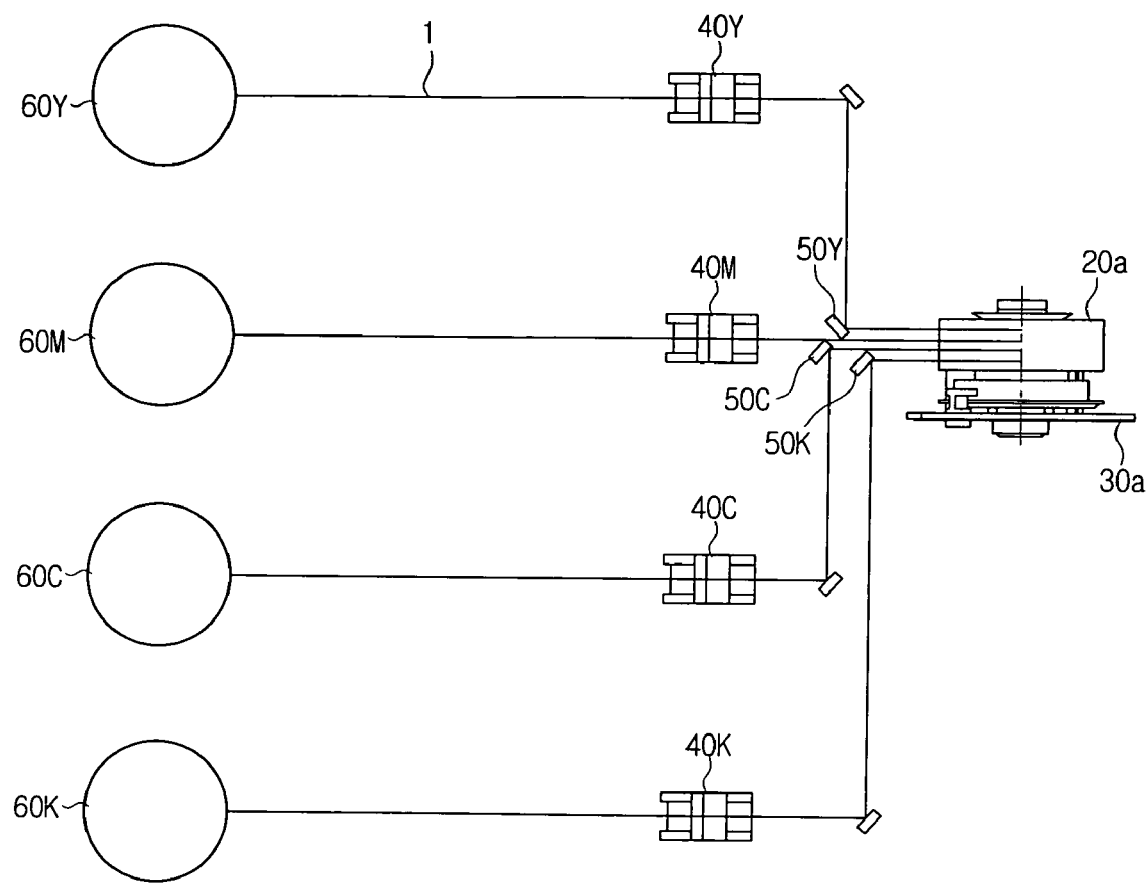
Figure 3:
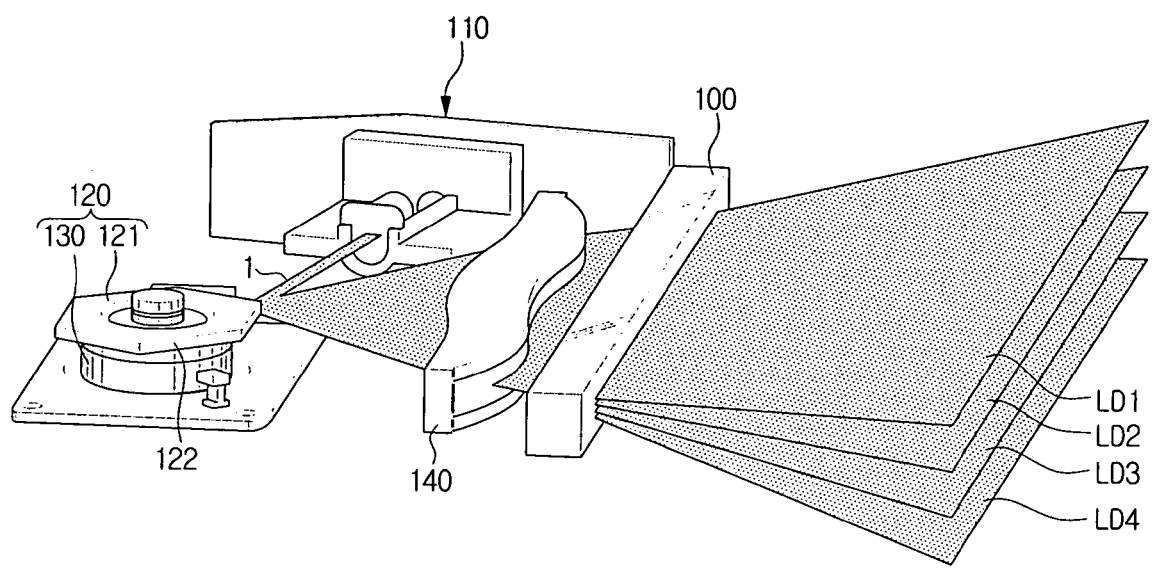
FIG. 3 is a schematic view of a laser scanning unit according to an exemplary embodiment of the present invention.

FIG. 3 illustrates the configuration of a laser scanning unit according to an exemplary embodiment of the present invention. Referring to FIG. 3, the laser scanning unit includes a light source 110 for emitting a plurality of laser beams 1, a rotating polygon mirror 120 for reflecting and deflecting the laser beams 1 in a predetermined direction, an fθ lens 140 for transmitting the laser beams 1 so that the laser beams deflected from the rotating polygon mirror 120 can scan onto the surfaces of a plurality of photosensitive drums (not shown) and form images thereon, and a beam splitter 100 disposed at a rear end of the fθ lens 140 for separating the laser beams.

In an exemplary embodiment, the light source 110 is a laser semiconductor chip, or, more particularly, a single semiconductor chip that is capable of emitting a plurality of laser beams simultaneously.

The rotating polygon mirror 120 is driven by a driving means 130, such as a motor, installed under a polygon mirror 121. The polygon mirror 121 is formed of a plurality of deflecting planes 122, and the laser beams 1 emitted from the light source 110 strike the rotating polygon mirror at a predetermined incidence angle from the deflecting planes to a sub-scanning direction.

A collimating lens (not shown) and a cylindrical lens (not shown) are disposed between the light source 110 and the rotating polygon mirror 120. The collimating lens forms the laser beam from the light source 110 into parallel rays or focuses the beam, whereas the cylindrical lens converges the laser beam that passes through the collimating lens to be incident on the rotating polygon mirror 120.

The fθ lens 140 has a specific index of refraction with respect to an optical axis, and refracts the light traveling at a constant speed after having been reflected from the polygon mirror in a main scanning direction. In addition, the fθ lens 140 corrects any aberration of the light reflected from the polygon mirror and focuses the light onto the scanning plane.

The beam splitter 100 is disposed at a rear end of the fθ lens 140. Preferably, a transmissive beam splitter capable of transmitting laser beams is used in the laser scanning unit.

Figure 4:
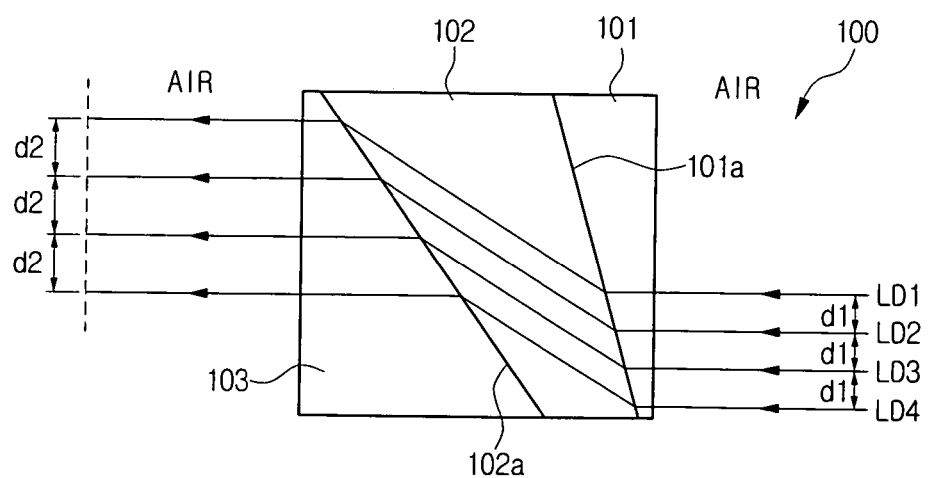
FIG. 4 is a vertical sectional view of the beam splitter in FIG. 3.

FIG. 4 shows in detail the vertical sectional structure of the beam splitter according to an exemplary embodiment of the present invention. As depicted in FIG. 4, the beam splitter 100 has a structure where mediums 101, 102, 103 of different indexes of refraction are arranged, thereby separating a plurality of laser beams LD1-LD4 in the sub-scanning direction. Preferably, the interfaces 101a, 102a between the different mediums are tilted so that they form inclined planes, respectively. In particular, the medium 102 with a low index of refraction is disposed between the mediums 101, 103 with a high indices of refraction. This arrangement of the beam splitter increases the space (or distance) d2 between emitted laser beams (from the side of the medium 103) so that it is greater than the space (or distance) d1 between incident laser beams (on the side of the medium 101).

Although the beam splitter in FIG. 4 is formed of three different mediums, the number of mediums for the beam splitter is not limited to three. Preferably, the beam splitter has an odd number of mediums greater than 3.

Figure 5:
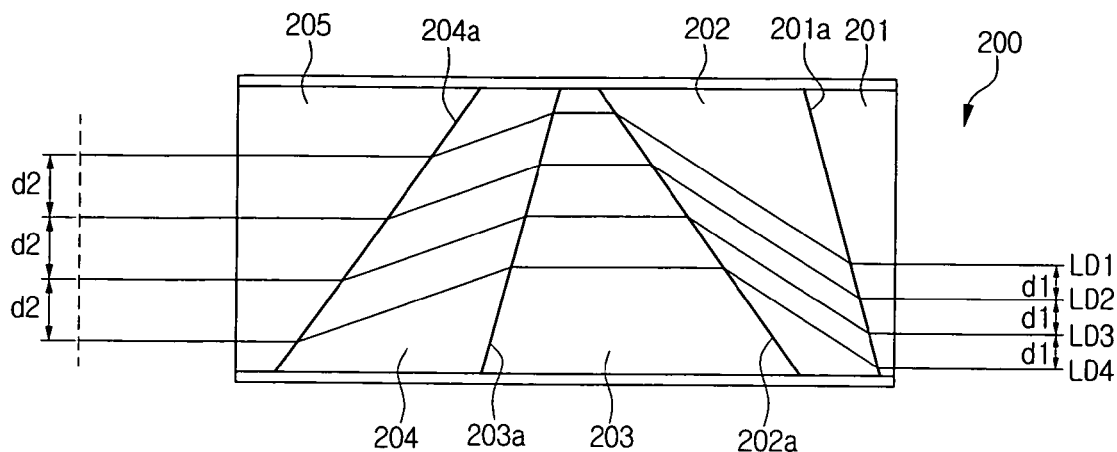
FIG. 5 is a vertical sectional view of another exemplary embodiment of a beam splitter according to the present invention.

FIG. 5 shows in detail the vertical sectional view of another exemplary embodiment of a beam splitter according to the present invention. In this example, the beam splitter has five different mediums 201-205. As in the previously described embodiment, the interfaces 201a-204a between the different mediums are tilted to form inclined planes. Moreover, the medium 202 with a low index of refraction is disposed between the mediums 201, 203 with a high index of refraction, and the medium 204 with a low index of refraction is disposed between the mediums 203, 205 with high indices of refraction. This arrangement makes it possible to increase the space (or distance) d2 between emitted laser beams (from the side of the medium 205) greater than the space (or distance) d1 between incident laser beams (on the side of the medium 201), and laser beams LD1-LD4 are distributed in a perpendicular direction.

Figure 6:
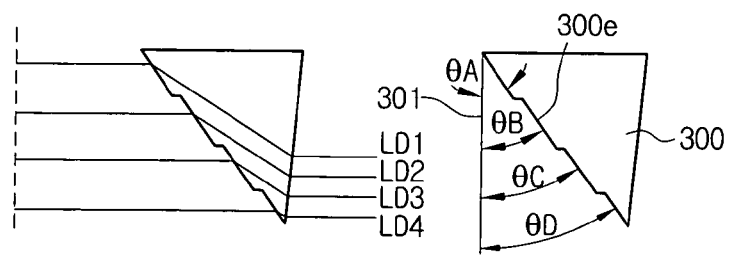
FIGS. 6 and 7 illustrate other exemplary embodiments of beam splitters according to the present invention.
Figure 7:
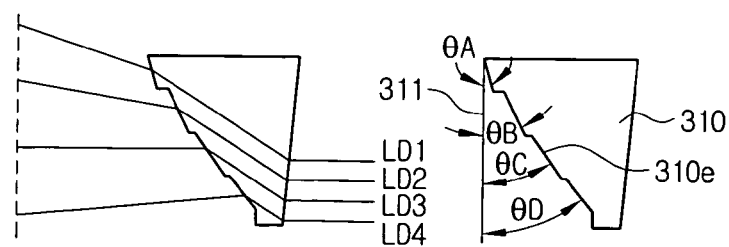

In additional exemplary embodiments, the beam splitter of the present invention may be formed of a single medium. FIG. 6 and FIG. 7 show an example of such beam splitters. Referring to the vertical sectional structure of the beam splitter formed of a single medium, an emitting plane 300e (FIG. 6) or 310e (FIG. 7) is formed in multiple, inclined steps with respect to the normal (line) of incident light 301 or 311. That is, the emitting plane of the beam splitter is inclined in a stepwise manner.

As illustrated in FIG. 6, the emitting plane 300e of the beam splitter 300 may be built in a manner that the inclination angles θA, θB θC, θD between the stepwise inclined planes and the normal 301 of the incident light are the same. In this case, the space between emitted light beams is greater than the space between incident light beams, yet the space between emitted light beams remain uniform.

In addition, as illustrated in FIG. 7, the emitting plane 310e of the beam splitter 310 may be built in a manner that the inclination angles θA, θB θC, θD between the stepwise inclined planes and the normal 311 of the incident light are different. In this case, the space between emitted light beams is greater than the space between incident light beams, and the space between emitted light beams are different from one another.

The beam splitter of exemplary embodiments of the present invention is based on the principle of Snell's Law (that is, $n_1 \sin(\theta_1) = n_2 \sin(\theta_2)$). Thus, the emission angle $\theta_2$ varies depending on the incidence angle $\theta_1$ and the index of refraction of a medium. Referring to FIG. 4, the laser beams LD1-LD4 that passed through the fθ lens 140 are incident on the beam splitter 100 from the air. At this time, because the beams enter the medium perpendicularly, no refraction occurs. Therefore, the laser beams are not refracted at the medium 101. When the laser beams incident on the medium 101 arrive at the medium 102, they are refracted closely to the incidence plane because the index of refraction $n_1$ of the medium 101 is greater than the index of refraction $n_2$ of the medium 102. Since the interface 102a between the medium 102 and 103 is inclined, the space between the beams is increased as they enter from the medium 102 to the medium 103. Based on this principle, a plurality of mediums having different indices of refraction are arranged so that the space between beams at the final emitting plane becomes greater than the space between the beams at the incident plane. In effect, the space between beams at the final emission plane is large enough for a conventional reflecting mirror to be able to separate the beams.

By using different mediums or placing the emitting planes of the mediums in a stepwise manner, the beam splitter separates the space between laser beams. In other words, with the beam splitter of the exemplary embodiments of the present invention, the space between the laser beams may be increased enough that conventional reflecting mirrors may be used separate the beams. Therefore, in a laser scanning unit provided with a beam splitter that uses the principles of the present invention, a conventional reflecting mirror may be employed between the beam splitter and the photosensitive drum.

A laser scanning unit using a beam splitter built in accordance with the principles of the present invention is suitable for use in a tandem color image forming apparatus. As compared with a conventional color image forming apparatus, a tandem color image forming apparatus using the principles of the present invention requires one rotating polygon mirror and one fθ lens. Therefore, the overall configuration of the apparatus is simplified, and the cost of manufacturing may be reduced.

Further, even closely spaced laser beams can easily be separated with the transmissive beam splitter of the present invention, and the space between the laser beams is increased enough that conventional reflecting mirrors are able to separate the beams. Accordingly, unlike a conventional tandem image forming apparatus that uses a plurality of motors and lenses, the laser scanning unit and the image forming apparatus of the exemplary embodiments of the present invention has a simplified configuration and the space required for installation is smaller.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A laser scanning unit, comprising:
    a light source for emitting a plurality of laser beams;
    a rotating polygon mirror for deflecting the plurality of laser beams in a predetermined direction;
    an fθ lens for transmitting the deflected laser beams to be scanned onto surfaces of a plurality of photosensitive drums; and
    a beam splitter disposed at a rear end of the fθ lens for splitting the laser beams.

2. The laser scanning unit according to claim 1, wherein the beam splitter comprises mediums having different indexes of refraction, the mediums being arranged so that the plurality of laser beams are split in a perpendicular direction (sub-scanning direction).

3. The laser scanning unit according to claim 2, wherein the beam splitter comprises mediums having different indexes of refraction, the mediums being arranged so that a space between emitted laser beams is larger than a space between incident laser beams.

4. The laser scanning unit according to claim 2, wherein interfaces between the mediums having different indexes of refraction are inclined.

5. The laser scanning unit according to claim 4, wherein the inclined interfaces of the mediums in the beam splitter are planar.

6. The laser scanning unit according to claim 2, wherein a total number of mediums of the beam splitter is an odd number greater than 3.

7. The laser scanning unit according to claim 6, wherein a medium with a small index of refraction in the beam splitter is disposed between mediums with large indices of refraction.

8. The laser scanning unit according to claim 1, wherein, an emitting plane of the beam splitter is inclined in a stepwise manner with respect to a normal of incident laser beams in order to separate the laser beams in a perpendicular direction (sub-scanning direction).

9. The laser scanning unit according to claim 8, wherein inclination angles between the stepwise inclined planes of the emitting plane of the beam splitter and the normal of the incident laser beams are the same.

10. The laser scanning unit according to claim 8, wherein inclination angles between the stepwise inclined planes of the emitting plane of the beam splitter and the normal of the incident laser beams are different from one another.

11. The laser scanning unit according to claim 1, wherein the light source is formed of a semiconductor chip emitting a plurality of laser beams simultaneously.

12. The laser scanning unit according to claim 1 further comprises:
a reflecting mirror between the beam splitter and the photosensitive drums.

13. A tandem color image forming apparatus, comprising:
a laser scanning unit for modulating and scanning data to be printed into laser beams; and
a plurality of photosensitive drums having a latent image formed on surfaces thereof by the laser beams,
wherein the laser scanning unit comprises:
a light source formed of a semiconductor chip for emitting a plurality of laser beams;
a rotating polygon mirror for deflecting the plurality of laser beams in a predetermined direction;
an fθ lens for transmitting the deflected laser beams to be scanned onto the surfaces of the plurality of photosensitive drums; and
a beam splitter formed of different mediums and disposed at a rear end of the fθ lens for separating the laser beams.

14. The apparatus according to claim 13, wherein interfaces between different mediums in the beam splitter are inclined.

15. The apparatus according to claim 14, wherein the inclined interfaces of the mediums in the beam splitter are planar.

16. The apparatus according to claim 13, wherein a total number of mediums of the beam splitter is an odd number greater than 3.

17. The apparatus according to claim 16, wherein a medium with a small index of refraction in the beam splitter is disposed between mediums with large indices of refraction.

18. A tandem color image forming apparatus, comprising:
a laser scanning unit for modulating and scanning data to be printed into laser beams; and
a plurality of photosensitive drums having a latent image formed on surfaces thereof by the laser beams,
wherein the laser scanning unit comprises:
a light source formed of a semiconductor chip for emitting a plurality of laser beams;
a rotating polygon mirror for deflecting the plurality of laser beams in a predetermined direction;
an fθ lens for transmitting the deflected laser beams to be scanned onto the surfaces of a plurality of photosensitive drums; and
a beam splitter disposed at a rear end of the fθ lens, the beam splitter having a stepwise inclined emitting plane with respect to a normal of an incident light for separating the laser beams.

19. The apparatus according to claim 18, wherein inclination angles between the stepwise inclined planes of the emitting plane of the beam splitter and the normal of the incident laser beams are the same.

20. The apparatus according to claim 18, wherein inclination angles between the stepwise inclined planes of the emitting plane of the beam splitter and the normal of the incident laser beams are different from one another.

* * * * *